United States Patent
Naito et al.

(10) Patent No.: US 9,233,693 B2
(45) Date of Patent: Jan. 12, 2016

(54) TIRE SENSING SYSTEM

(71) Applicant: Panasonic Corporation, Osaka (JP)

(72) Inventors: Yasuyuki Naito, Osaka (JP); Keiji Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 14/276,208

(22) Filed: May 13, 2014

(65) Prior Publication Data

US 2014/0343797 A1    Nov. 20, 2014

(30) Foreign Application Priority Data

May 17, 2013    (JP) .................................. 2013-105478

(51) Int. Cl.
| | |
|---|---|
| *B60W 50/00* | (2006.01) |
| *B60C 23/06* | (2006.01) |
| *B60W 40/10* | (2012.01) |
| *B60T 8/172* | (2006.01) |

(52) U.S. Cl.
CPC .......... *B60W 50/0098* (2013.01); *B60C 23/064* (2013.01); *B60C 23/065* (2013.01); *B60T 8/1725* (2013.01); *B60W 40/10* (2013.01); *B60C 2019/004* (2013.04); *B60T 2240/04* (2013.01)

(58) Field of Classification Search
CPC  B60W 50/0098; B60W 40/10; B60C 23/065; B60L 11/00; B60T 8/1725
USPC .......................................................... 701/45
See application file for complete search history.

(56) References Cited

U.S. PATENT DOCUMENTS

| | | | | |
|---|---|---|---|---|
| 6,105,423 | A * | 8/2000 | Prottey .......................... | 73/146.5 |
| 7,205,886 | B2 * | 4/2007 | Kin ................................ | 340/442 |
| 7,428,467 | B2 * | 9/2008 | Obunai ........................... | 702/145 |
| 7,673,495 | B2 * | 3/2010 | Albohr et al. ........................ | 73/9 |
| 2008/0012698 | A1 * | 1/2008 | Kobayashi et al. ............ | 340/442 |
| 2011/0219864 | A1 * | 9/2011 | Yukawa et al. ............... | 73/146.3 |
| 2012/0143399 | A1 * | 6/2012 | Noumura et al. .................. | 701/1 |

FOREIGN PATENT DOCUMENTS

JP        2005-022457        1/2005

* cited by examiner

*Primary Examiner* — Mary Cheung
*Assistant Examiner* — Michael Berns
(74) *Attorney, Agent, or Firm* — Wenderoth, Lind & Ponack, L.L.P.

(57) ABSTRACT

Provided is a tire sensing system that reduces the power consumption, size, weight, and cost, while suppressing an increase in fuel consumption of moving means. The tire sensing system is adapted to monitor state of a tire or a road surface from vibration information to perform safety control of the moving means having the tire. The tire sensing system includes a sensor disposed in a position of an inner surface of the tire where the sensor can sense the vibration, a receiver for receiving the information sent from the sensor, and a control means for controlling the moving means on the basis of the information from the receiver. The state is estimated from first vibration applied to the sensor upon contact with the road surface via the tire, second vibration applied to the sensor upon departure from the road surface, and a contact time from the contact to the departure.

13 Claims, 14 Drawing Sheets

TIRE SENSING SYSTEM

CROSS-REFERENCE TO RELATED APPLICATIONS

The present application relates to and claims priority to Japanese Patent Application Serial No. 2013-105478 titled "TIRE SENSING SYSTEM" filed on May 17, 2013, the content of which is incorporated herein by reference in its entirety.

BACKGROUND OF THE INVENTION

1. Field of the Invention

The present disclosure relates to a tire sensing system for safety control of a vehicle by monitoring state of a tire or a road surface based on physical information on the tire and its surroundings (for example, information about an air pressure of the tire, vibration from the road surface, and the like).

2. Description of the Related Art

Recently, some attempts have been made to prevent traffic accidents from occurring due to a decrease in air pressure of a tire or an increase in temperature of the tire by recognizing the state of a road surface or the state of a tire, for example, for a motor vehicle or motor bike by use of a wireless sensing network.

PRIOR ART DOCUMENT

Patent Document

Patent document 1 JP 2005-22457 A

SUMMARY

Problems to be Resolved by the Invention

For example, as disclosed in the patent document 1 (JP 2005-22457 A), state of a tire is recognized by measuring the air pressure or temperature of the tire with a measurement device, such as a thermometer, or a physical quantity sensor, such as a pressure sensor, an acceleration sensor, or a strain sensor. However, it is difficult to miniaturize such a physical quantity sensor or measurement device. The attachment of such devices on the tire might lead to a drastic increase in fuel consumption of a vehicle even when weight of the tire increases insignificantly due to the devices attached to the tire, since the tire is subject to tens of thousands of revolutions or hundreds of thousands of revolutions during traveling of the vehicle.

A power source device is additionally required to be attached on the tire for the purpose of operating the physical quantity sensor or thermometer, which might disadvantageously increase the total weight of the devices attached to the tire, further resulting in an increase in fuel consumption of the vehicle. Such a power source device is one that is designed to generate electric energy, for example, by changing a magnetic flux using the rotation of the tire. The power source device uses a coil for power generation, and a magnet or electric magnet. Thus, the power source device itself has a large size, which makes it difficult to reduce the weight and size of the device.

The present disclosure has been made in view of the above problems, and it is an object of some embodiments of the present invention to provide a tire sensing system that can reduce the power consumption, size, weight, and cost, while suppressing an increase in fuel consumption of moving means using the sensing system.

Solution to Problems

In order to achieve the above object, the present disclosure is directed to a tire sensing system for monitoring state of a tire or a road surface from information on vibration around the tire to perform safety control of moving means having the tire. The tire sensing system includes a sensor disposed in a position of an inner surface of the tire where the sensor senses the vibration, a receiver for receiving the information on vibration sent from the sensor, and a control means for controlling the moving means (for example, vehicle) on the basis of the information on the vibration from the receiver. The state of the tire or the road surface is estimated from first vibration applied to the sensor upon contact of the sensor with the road surface via the tire due to rotation of the tire, second vibration applied to the sensor upon departure of the sensor from the road surface, and a contact time from the contact of the sensor with the road surface to the departure of the sensor from the road surface.

Advantageous Effects of Invention

The tire sensing system according to the embodiment of the present invention can estimate the state of the tire or the road surface from information on vibration obtained from a generation vibration sensor having functions of power generation and acceleration sensing. This arrangement eliminates the need for the physical quantity sensor, such as an acceleration sensor, which can simplify the structure of the tire sensing system by decreasing the number of parts thereof. Thus, some embodiments of the present invention can reduce the power consumption, size and cost of the tire sensing system.

BRIEF DESCRIPTION OF THE DRAWINGS

The drawings attached hereto illustrate the inventions according to the embodiments of the present application, and thus it is not interpreted that the present invention is limited by the drawings.

FIG. 1A shows state where a generation vibration sensor is just about to reach the ground.

FIG. 1B shows state where the generation vibration sensor is just about to get apart from the ground.

FIG. 4A shows state where a movable substrate is not displaced with respect to a fixed substrate.

FIG. 4B shows state where the movable substrate is displaced rightward with respect to the fixed substrate.

DETAILED DESCRIPTION OF THE EMBODIMENT

Figure 1A:
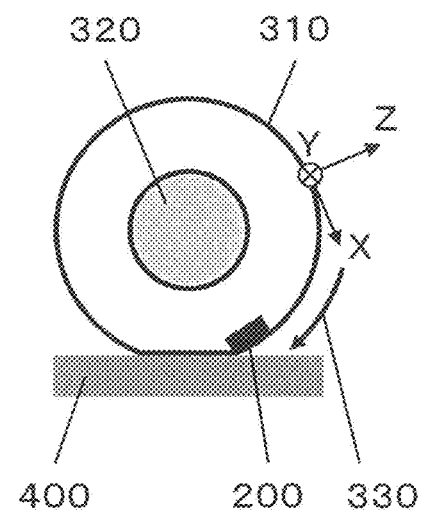
FIG. 1A is a schematic view showing the structure of a tire sensing system according to a first embodiment of the present invention.

Embodiments of the present invention will be concretely described below with reference to the accompanying drawings. The embodiments of the present invention should be interpreted to be merely for the purposes of illustration and the present invention should not be limited by the embodiments.

As a result of intensive studies about the problems in the related art, the present inventors have found that the state of the tire or the road surface can be determined by a power waveform of a vibration power generator including a MEMS element being conventionally dedicated to supply power to a device serving as a sensor, such as a wireless device, that is, by a power waveform generated upon receiving vibration. Further, the present inventors have found that the vibration power generator formed of the MEMS element performs acceleration sensing, which can omit the physical quantity sensor having difficulty in reducing its size and weight, and hence can reduce the weight and size of the tire sensing system. As a result of further studies, the present inventors have found that the vibration power generator formed of the MEMS element is used for supply of power for transmitting information obtained by the sensing function to the external unit (for example, a receiver outside the sensor from the transmitter provided in the sensor), so that only one MEMS element can have two functions of the acceleration sensing and power source, which can reduce the power consumption, size, weight, and cost of the tire sensing system, while suppressing the increase in fuel consumption of the moving means used for the tire sensing system, leading to the completion of some embodiments of the present invention.

The present disclosure has been made on the basis of the above findings, and provides a tire sensing system for monitoring state of a tire or a road surface from information on vibration around the tire to perform safety control of moving means having the tire. The tire sensing system includes a sensor disposed in a position of an inner surface of the tire where the sensor can sense the vibration (preferably, a generation vibration sensor including a power generating element for converting vibration into electric power, and adapted to detect the vibration caused by impact with the road surface). The tire sensing system arbitrarily includes a power system for extracting the vibration information obtained by the power generating element (first power system); a second power system for supplying electric power for sending the vibration information extracted by the first power system to the outside; a receiver for receiving the vibration information extracted by the power system and sent to the outside; and a control means for controlling the tire on the basis of the vibration information from the receiver.

The vibration information is obtained from first vibration applied to the sensor upon contact of the sensor with the road surface via the tire due to the rotation of the tire, second vibration applied to the sensor upon departure of the sensor from the road surface, and a contract time from the contact of the sensor with the road surface to the departure of the sensor from the road surface. For example, a vibration information is compared with reference vibration information, so that the state of the tire or the road surface can be estimated.

The use of the generation vibration sensor as a sensor will be described below.

In the embodiments, the tire sensing system may additionally include another power generator and electricity storage unit. The electric power may not be supplied by the generation vibration sensor included in the tire sensing system to the tire sensing system (particularly, the above-mentioned generation vibration sensor), and instead of this, may be supplied from the above generator or electricity storage unit to the tire sensing system (particularly, the above-mentioned generation vibration sensor). Alternatively, the tire sensing system does not have another generator and electricity storage device, and the generation vibration sensor included in the tire sensing system may generate electric power and supply the power to the tire sensing system (particularly, the generation vibration sensor).

A description will be made on the case where the tire sensing system does not have another generator or electricity storage unit and the generation vibration sensor generates electric power and supplies the power to the tire sensing system (particularly, generation vibration sensor), that is, the case where the generation vibration sensor extracts the vibration information obtained by the power generating element, and supplies the power for sending the vibration information extracted by the first power system to the outside.

The above-mentioned generation vibration sensor includes a power generating element for converting vibration into electric power, a first power system for extracting the vibration information obtained by the power generating element, and a second power system connected to the power generating element, and adapted to supply the electric power for sending the vibration information extracted by the first electric system to the outside. Specific embodiments of the power generating element include an electrostatic type using an electret in a first embodiment, and a piezoelectric type using a piezoelectric element in a second embodiment.

The term "generation vibration sensor" as used in the present disclosure corresponds to a "generation vibration sensor 100" of the embodiments below. A transmitter 200 includes the generation vibration sensor 100, a controller 210, and a transmitting unit 220. The term "power system (first power system)" as used in the present disclosure corresponds to a route from the generation vibration sensor/vibration power generator 100 to the transmitting unit 220 via the controller 210. The term "power system (second power system)" as used in the present disclosure corresponds to a route from a power source unit 150 including the generation vibration sensor/vibration generator 100 to the controller 210 or transmitting unit 220. The term "receiver" as used in the present disclosure corresponds to a "receiver 500" according to the below-mentioned embodiments, which includes a receiving unit 510, a signal processor 520, a data analysis unit 530, and a vehicle control instruction unit 540. The term "control means" as used in the present disclosure corresponds to a "vehicle controller 600" of the embodiments below, and serves to display a warning in the above-mentioned display unit, and to brake the moving means, such as a motor vehicle.

The respective components of the tire sensing system will be described in detail below.

<1. First Embodiment>
<1-1. Structure>
<1-1-1. Entire Structure>

Figure 1B:
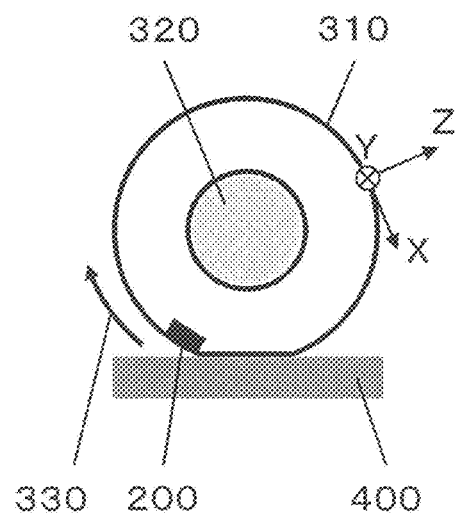
FIG. 1B is a schematic view showing the structure of a tire sensing system according to a first embodiment of the present invention.

FIG. 1 shows a diagram of the structure of a tire sensing system (system using a generation vibration sensor by way of example) in a first embodiment of the present invention. As shown in FIG. 1, the transmitter 200 of the first embodiment is installed on the inner side of a tire 310 attached to a wheel 320. Thus, the transmitter 200 rotates along a rotary direction 330 of the tire. FIG. 1A shows the state where the transmitter 200 comes in contact with a road surface 400 via a tire. In contrast, the transmitter 200 rotates along a rotary direction 330 of the tire. FIG. 1B shows the state where the transmitter 200 moves apart from the road surface 400. The transmitter 200 transmits a data signal for determining the state of the tire or the road surface.

Figure 2:
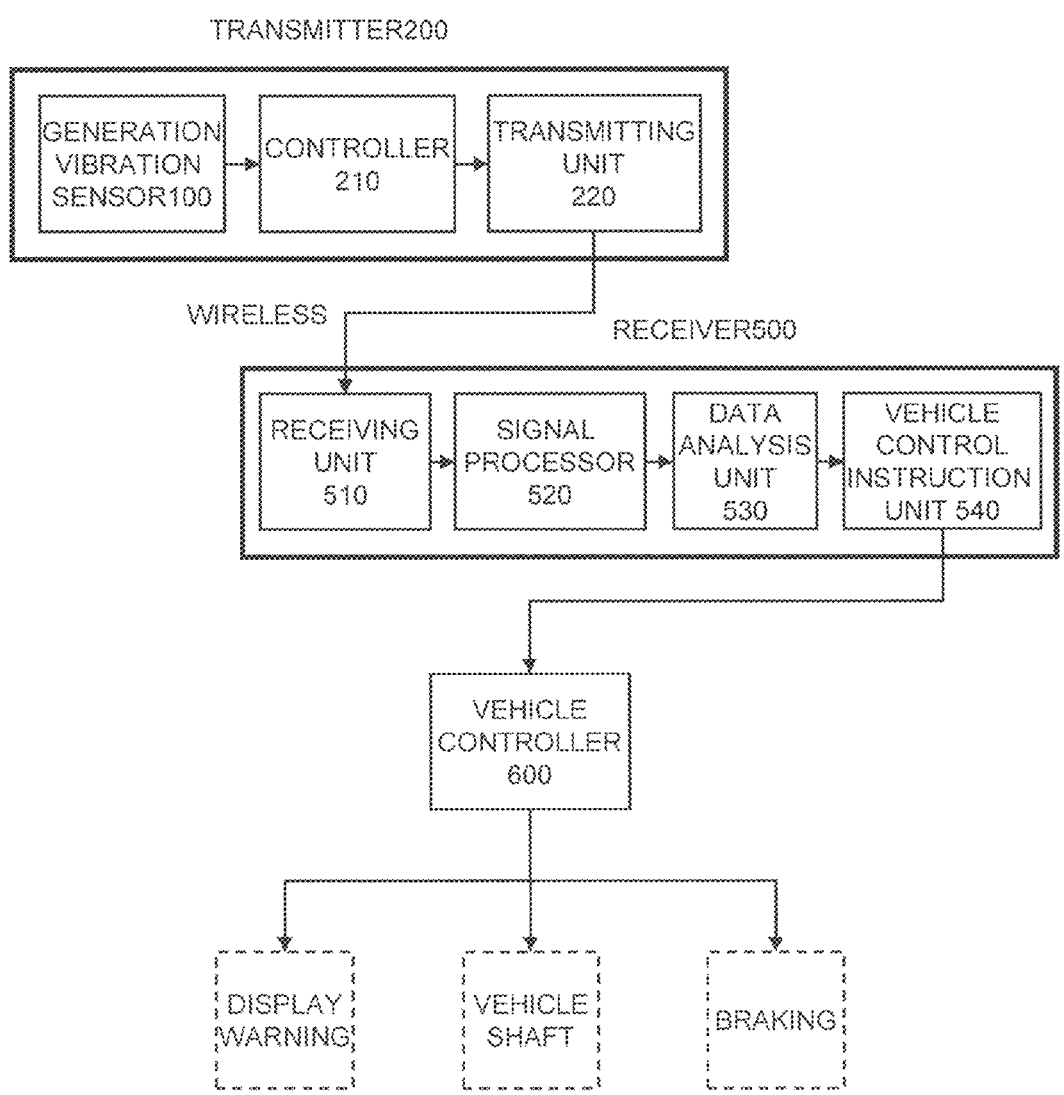
FIG. 2 is a block diagram showing the structure of the tire sensing system according to the first embodiment.

FIG. 2 shows a block diagram of the structure of the tire sensing system in the first embodiment. The tire sensing system mainly includes the transmitter 200 and the receiver 500 of the data signal, and a vehicle controller 600 for controlling the moving means (for example, a vehicle, such as a private motor vehicle) according to the state of the tire or the road surface determined. The transmitter 200 includes the generation vibration sensor 100, the controller 210, and the transmitting unit 220. The generation vibration sensor 100 detects vibration of the tire to transmit a data signal to the controller 210. The controller 210 sends the data signal and an instruction for data transmission to the transmitting unit 220. The data signal wirelessly transmitted by the transmitting unit 220 is input to the receiver 500. The receiver 500 includes the receiving unit 510, the signal processor 520, the data analysis unit 530, and the vehicle control instruction unit 540. The data signal is sent to the signal processor 520 by the receiving unit 510, and processed by removal of noise, smoothing, or the like, into clear data appropriate for data analysis. Then, the data signal processed by the signal processor 520 is transmitted to the data analysis unit 530. The data analysis unit 530 determines the state of the tire or the road surface on the basis of the waveform of vibration data. Then, an instruction for control of the vehicle according to the state of the tire or the road surface is given to the vehicle controller 600 by the vehicle instruction unit 540. The vehicle controller 600 controls the display of a warning, a vehicle shaft, and braking.

For example, when a road surface is slippery, a warning can be displayed to urge a driver to pay attention to the road surface. The control of the vehicle shaft or braking can cause the vehicle itself to positively implement a safety function to avoid a vehicle accident or crash caused by slipping of the vehicle.

Figure 3:
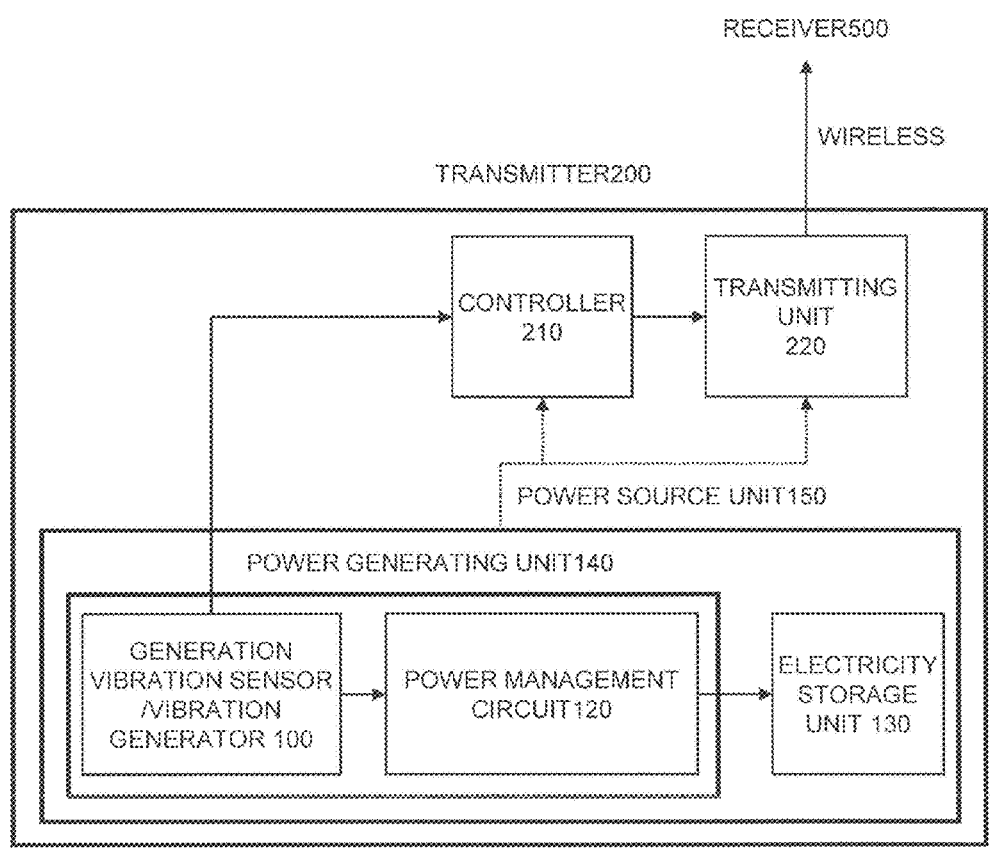
FIG. 3 is a block diagram showing the structure of a transmitter according to the first embodiment.

FIG. 3 is a block diagram showing the structure of the transmitter 200 according to the first embodiment. The first power system of the present invention is to extract information on vibration obtained by the power generating element. Referring to FIG. 3, the first power system means a route from the generation vibration sensor/vibration generator 100 to the transmitting unit 220 via the controller 210. The second power system according to the first embodiment of the present invention is to supply power for sending the information on vibration extracted by the first power system. Referring to FIG. 3, the second power system means a route from the power source unit 150 including the generation vibration sensor/vibration generator 100 to the controller 210 or transmitting unit 220.

The transmitter 200 includes the generation vibration sensor 100, the controller 210, and the transmission unit 220 as described above with reference to FIG. 2. The transmitter 200 of the first embodiment can use the generation vibration sensor 100 serving as a power generator for converting the external vibration energy into electric power, as a power source for driving the controller 210 and the transmitting unit 220 (hereinafter referred to as the generation vibration sensor 100 in use for sensing, also referred to as the vibration generator 100 in use for the generator, and further referred to as the generation vibration sensor/vibration generator 100 in use for both the sensing and the generator). The generation vibration sensor 100 constitutes a power generating unit 140 together with a power management circuit 120 for conversion into a direct-current voltage because the sensor 100 outputs the voltage according to the waveform of external vibration. The power source unit 150 supplies the electric power to the controller 210 and/or the transmitting unit 220 from the power generating unit 140. The power source unit 150 includes an electricity storage unit 130 in addition to the power generating unit 140. The power source unit 150 can supply the electric power from the electricity storage unit 130 to the controller 210 or the transmitting unit 220 as needed.

With this structure, the vibration information is extracted from the waveform of the generated power output from the generation vibration sensor 100, whereby the vibration generator can serve as the vibration sensor. This embodiment eliminates the need for the vibration sensor, such as an acceleration sensor, which can simplify the structure of the tire sensing system by decreasing the number of parts thereof. Further, this embodiment can reduce the power consumption, size, and cost of the transmitter 200.

As shown in FIG. 2, the receiver 500 includes the signal processor 520, the data analysis unit 530, and the vehicle control instruction unit 540 and these are not mounted on the transmitter 200, which can suppress the power consumption in the transmitter 200.

When noise or a transmission error occurs due to the wireless transmission to make the quality of a data signal unallowable, or when the power consumption of the transmitter 200 is allowable, the transmitter 200 may include the subsystems (blocks) of the receiver 500.

<1-1-2. Structure of Generation Vibration Sensor>

Figure 4A:
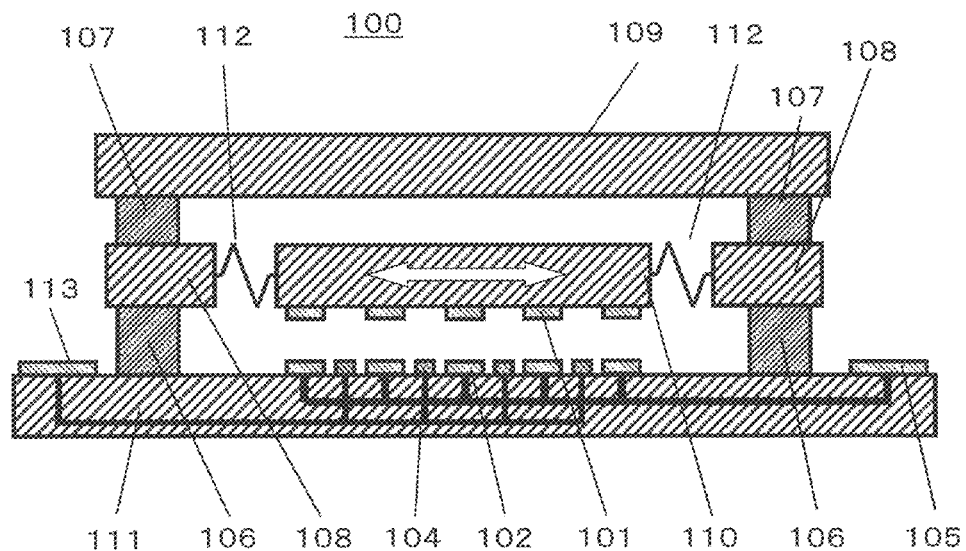
FIG. 4A is a cross-sectional view showing the generation vibration sensor according to the first embodiment.
Figure 4B:
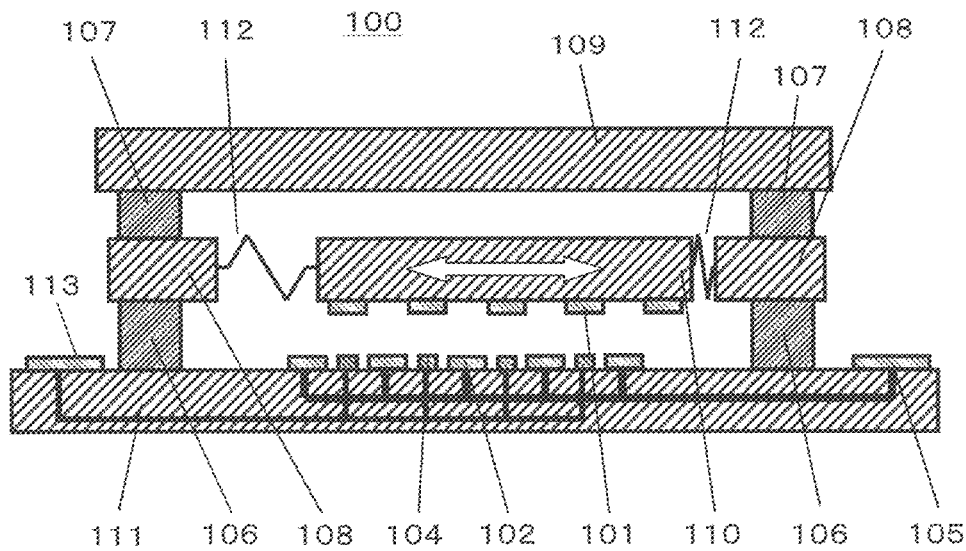
FIG. 4B is a cross-sectional view showing the generation vibration sensor according to the first embodiment.

Referring to FIG. 4, the structure of the generation vibration sensor 100 will be described below. As will be mentioned below, the generation vibration sensor 100 includes a movable substrate 110 vibrating therein. FIG. 4A shows the state where the movable substrate 110 is located at the center of vibration. FIG. 4B shows the state where the movable substrate 110 is displaced rightward from the center of vibration.

The generation vibration sensor 100 includes a lower substrate (first substrate) 111, an upper substrate (second substrate) 109, the movable substrate (hereinafter sometimes referred to as a movable portion, a weight, or a vibrator) 110, springs (elastic structures) 112, fixed structures 108, upper connection parts 107, lower connection parts 106, a plurality of electrets 101, a plurality of first electrodes 102, a plurality of second electrodes 104, a first pad 105, and a second pad 113.

The upper substrate 109 and the lower substrate 111 are disposed in parallel and opposed to each other. The upper substrate 109 and the lower substrate 111 are disposed at respective predetermined distances from a member including the movable substrate 110, the springs 112, and the fixed structures (intermediate substrates) 108. The upper substrate 109 and the lower substrate 111 are fixed to the above member by the upper connection parts 107 and the lower connection parts 106.

As shown in FIG. 4, the member including the fixed structure 108, the movable substrate 110, and the spring 112 is formed by processing one piece of substrate. Thus, the member including the fixed structure 108, the movable substrate 110, and the spring 112 may be equal to "the intermediate substrates 108 being connected to the movable substrate 110 by the elastic structures 112", or "the intermediate substrate 108 including the weight 110 being movable by the elastic structures 112".

The movable substrate 110 is configured to be movable in at least one axial direction parallel to the upper substrate 109 or lower substrate 111 (for example, in the directions indicated by a both direction arrow of FIG. 4). Thus, as shown in FIG. 4B, the movable substrate 110 can vibrate (reciprocate) in parallel to the upper substrate 109, following the force (vibration) applied from the outside.

The surface of the upper substrate 109 facing the lower substrate 111 is referred to as a lower surface. The surface of the lower substrate 111 facing the upper substrate 109 is referred to as an upper surface.

On the upper surface of the lower substrate 111, the plurality of first electrodes 102 and the plurality of second electrodes 104 are provided. The first electrodes 102 and the second electrodes 104 are alternately disposed. The wirings for connecting the plurality of first electrodes 102 are connected to the first pad 105 through a region near the upper surface within the lower substrate 111. The wirings for connecting the plurality of second electrodes 104 are connected to the second pad 113 through a region near the lower surface within the lower substrate 111. The first pad 105 is electrically isolated from the second pad 113. The generation vibration sensor 100 outputs the generated electric power through the first pad 105 and the second pad 113, respectively.

A plurality of electrets 101 are provided over the surface of the movable substrate 109 opposed to the lower substrate 111. The electret is formed of a material that can receive electricity and hold charges. Each electret 101 is provided such that the electrical flux line is oriented perpendicular to the upper surface of the lower substrate 111, and that the direction of the electrical flux line is oriented from the movable substrate 110 toward the lower substrate 111.

The lower substrate 111 and the fixed structure 108 are bonded together by the lower bonding part 106 so as to form a predetermined clearance between the first electrode 102 and the electret 101.

Figure 5:
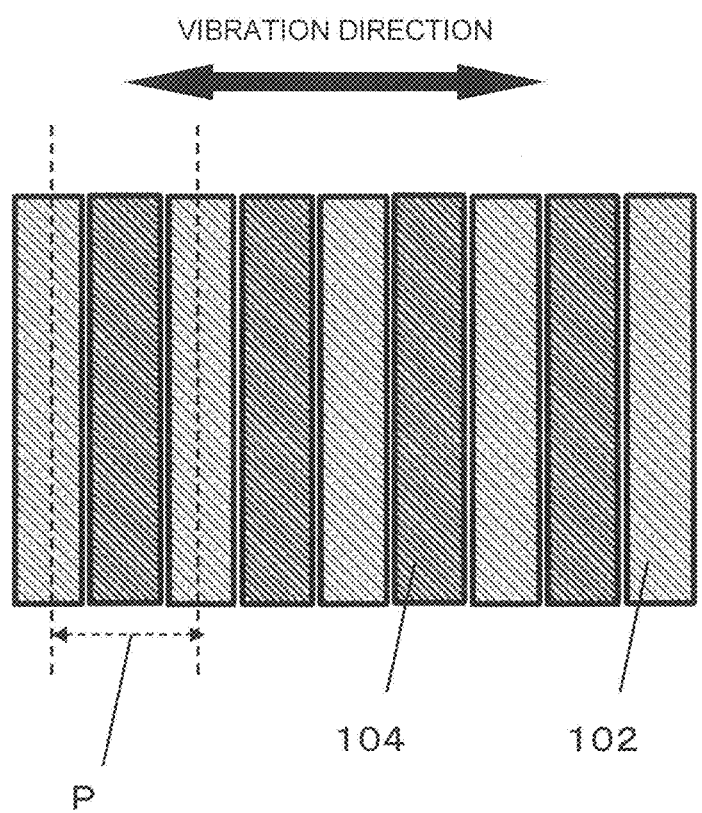
FIG. 5 is a diagram for describing a relationship between the arrangement of first and second electrodes and the vibration direction of the movable substrate in one aspect of the generation vibration sensor in the first embodiment.

Referring to FIG. 5, the arrangement of the electrodes 102 and 104 and electret 101 will be described below. FIG. 5 is a diagram of the upper surface of the lower substrate 111 viewed from the direction perpendicular to the upper surface of the lower substrate 111. The both direction arrow in FIG. 5 shows the directions in which the movable substrate 110 can vibrate.

As shown in FIG. 5, the first electrodes 102 and the second electrodes 104 are arranged so as to be oriented in the direction perpendicular to the direction in which the movable substrate 110 (not shown in FIG. 5) can vibrate, and in the direction parallel to the upper surface of the lower substrate 111. The reference numeral "P" in FIG. 5 indicates a distance between the central lines of the two first electrodes 102 adjacent to the second electrode 104 on both sides of the second electrode 104. The plurality of first electrodes 102 are arranged in parallel to each other with an equal distance between the respective central lines P. The second electrodes 104 are arranged in parallel to the first electrode 102 and between the two first electrodes 102. For example, the width of each of the first electrode 102 and the second electrode 104 (dimension of the movable substrate 110 in the vibratable direction) is preferably in a range of 50 to 500 μm, and more preferably about 100 μm. Such setting can form a number of first electrodes 102 and second electrodes 104 in limited regions, which can increase the generated power output and sensitivity. When the width of each of the first electrode 102 and second electrode 104 is 100 μm, the distance P becomes 200 μm.

A plurality of electrets 101 are arranged on the main surface on the lower substrate 111 side of the two main surfaces of the movable substrate 110 in such a manner as to be aligned with the respective electrodes 102 as viewed from the direction perpendicular to the upper surface of the lower substrate 111. That is, the electrets 101 have the same size as that of the first electrode 102, and are arranged at the same distance as the distance P between the first electrodes 102. The width of the electret 101 may be different from that of the first electrode 102. In this case, the electrets 101 are arranged with the same distance P between the central lines thereof such that the central line of the electret 101 is superimposed on the central line of the first electrode 102. This arrangement cause the electrets 101 to be displaced symmetrically in the left and right directions with respect to its central line, which can produce the waveforms of current and voltage with less fluctuations in level in positive and negative directions in a symmetric manner. The above arrangement also can facilitate the signal processing for the output.

Figure 6:
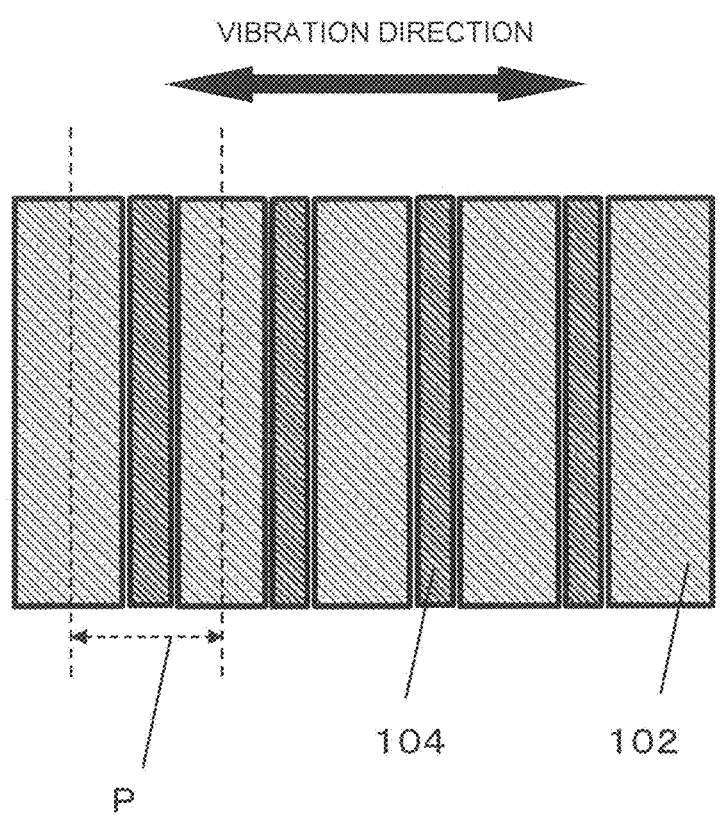
FIG. 6 is a diagram for describing a relationship between the arrangement of first and second electrodes and the vibration direction of the movable substrate in another aspect of the generation vibration sensor in the first embodiment.

As shown in FIG. 6, the first electrode 102 used for power generation may be formed more largely than the second electrode 104 used for sensing to determine the state of the tire or the road surface (for example, the length of the first electrode 102 and the second electrode 104 in the width direction of the movable substrate 110 may be constant, but the length of the first electrode 102 in the vibration direction of the movable substrate 110 may be larger than that of the second electrode 104 in the same direction). With this arrangement, the power output generated from the first electrode 102 can be increased.

In the embodiment shown in FIG. 6, the width of the first electrode 102 is preferably in a range of 100 to 500 μm, and more preferably 100 to 300 µm. The width of the second electrode 104 is preferably in a range of 50 to 200 µm, and more preferably 50 to 100 µm. Such setting can form a number of first electrodes 102 and second electrodes 104 in limited regions, which can increase the generated power output and sensitivity.

<1-2. Operation of Generation Vibration Sensor>

Turning back to FIG. 4, the operation of the generation vibration sensor 100 will be described below. In the generation vibration sensor 100, the movable substrate 110 vibrates horizontally while following the force (for example, vibration) received from the external environment. A spring constant and resonance frequency of the elastic structure 112 are optimized such that the maximum amplitude is generated at a vibration frequency of the external environment (for example, vibration of a vehicle during traveling) assumed.

During vibration, the movable substrate 110 is alternatively switched between the state where an opposed area of the electret 101 and the first electrode 102 (an overlapping area between a projected view of the electret 101 and a projected view of the first electrode 102 when viewed from the generation vibration sensor 100) is maximum as shown in FIG. 4A, and the state where the opposed area of the electret 101 and the first electrode 102 is decreased as shown in FIG. 4B.

As the opposed area between the electret 101 and the first electrode 102 becomes larger, the electric flux line of the electret 101 is oriented from the movable substrate 110 toward the lower substrate 111, which results in an increase in amount of charges drawn to the first electrode 102 (feeding). On the other hand, as the opposed area therebetween becomes smaller, the amount of charges drawn to the first electrode 102 is decreased, that is, the charges released becomes larger (discharge). In other words, when the opposed area between the electret 101 and the first electrode 102 becomes larger, an electrostatic capacitance between the electret 101 and the first electrode 102 is increased. In contrast, as the opposed area therebetween becomes smaller, the electrostatic capacitance becomes smaller.

The opposed area between the electret 101 and the first electrode 102 becomes larger to draw charges toward the first electrode 102, so that the current flows in the direction from the first pad 105 to the power management circuit 120. On the other hand, the electrons drawn into the first electrode 102 are released by the decrease in opposed surface, thereby allowing the current to flow in the direction from the power management circuit 120 to the first pad 105. Such a power generating operation generates alternate-current power. The same goes for the electret 101 and the second electrode 104. Due to the vibration of the movable substrate 110, the current is output and input between the second electrode 104 and the power management circuit 120 through the second pad 113. Such a power generating operation of the generation vibration sensor 100 generates alternate-current power.

At this time, the alternate-current powers output from the first pad 105 and the second pad 113 are the same to each other in transition of fluctuation of the power. That is, when the alternate-current power from the first pad 105 is increased, the alternate-current power from the second pad 113 is also increased. The same goes for the case when the alternate-current power from the first pad 105 is decreased. The respective alternate-current powers vary in synchronism with each other.

The power management circuit 120 converts the alternate-current power output through the first pad 105 of the generation vibration sensor 100 into direct-current power to be output.

In contrast, the alternate-current power output through the second pad 113 of the generation vibration sensor 100 is input to the controller 210 as a data signal for vibration.

<1-3. Modification>

As a modification of the first embodiment, only either the first electrodes 102 or the second electrodes 104 may be disposed over the lower substrate 111, and the first power system and the second power system may be connected to the electrode. Further, one power system connected to and leading from the electrode may be branched into one or more first power systems and one or more second power systems. This arrangement can simplify the structure of the generation vibration sensor. The first electrodes 102 or second electrodes 104 located at the lower substrate 111 are provided at equal intervals in the direction perpendicular to the vibration direction of the movable substrate 110.

Alternatively, either the first electrodes 102 or second electrodes 104 are disposed over the lower substrate 111 to be connected to one power system. By the one power system, the sensing may be performed and then the one power system may perform the power generation. After the power generation by the one power system, the same one power system may perform sensing.

<1-4. Summary of First Embodiment>

As mentioned above, the transmitter 200 of the first embodiment includes the generation vibration sensor 100 for generating power upon receiving vibration, while detecting the vibration, the controller 210 for controlling transmission of a signal of vibration data, and the transmitting unit 220. The generation vibration sensor 100 outputs the power from the first electrodes 102 and the second electrodes 104. The power management circuit 120 converts the output from the first electrodes 102 of the generation vibration sensor 100 to another electric power. The controller 210 controls the transmission of the signal of the vibration data based on the output from the second electrodes 104 of the generation vibration sensor 100.

The outer surface of the generation vibration sensor 100 with a larger area (for example, the bottom surface of the lower substrate 111 or the upper surface of the upper substrate 109 shown in FIG. 4) is placed in parallel to the back surface of the tire 310 and firmly fixed to the tire 310. In this case, when the tangential direction X of the circular tire 310 shown in FIG. 1 can be aligned with the vibration direction of the movable substrate 110 of the generation vibration sensor 100 shown in FIG. 4 (for example, in the directions indicated by the both direction arrow of FIG. 4), which can make effective use of the vibration in the direction X.

With this structure, the vibration information is extracted from the waveform of the generated power output from the generation vibration sensor 100, whereby the vibration generator can serve as the vibration sensor. This embodiment eliminates the need for the vibration sensor, such as an acceleration sensor, which can simplify the structure of the tire sensing system by decreasing the number of parts thereof. Further, this embodiment can reduce the power consumption, size, and cost of the transmitter 200.

Moreover, this embodiment can achieve the high reliability of the generation vibration sensor 100 on the tire 310, the effective power generation, and the high sensitive detection of vibration.

<2. Second Embodiment>

A second embodiment of the present invention will be described below.

<2-1. Structure and Operation>

Figure 7:
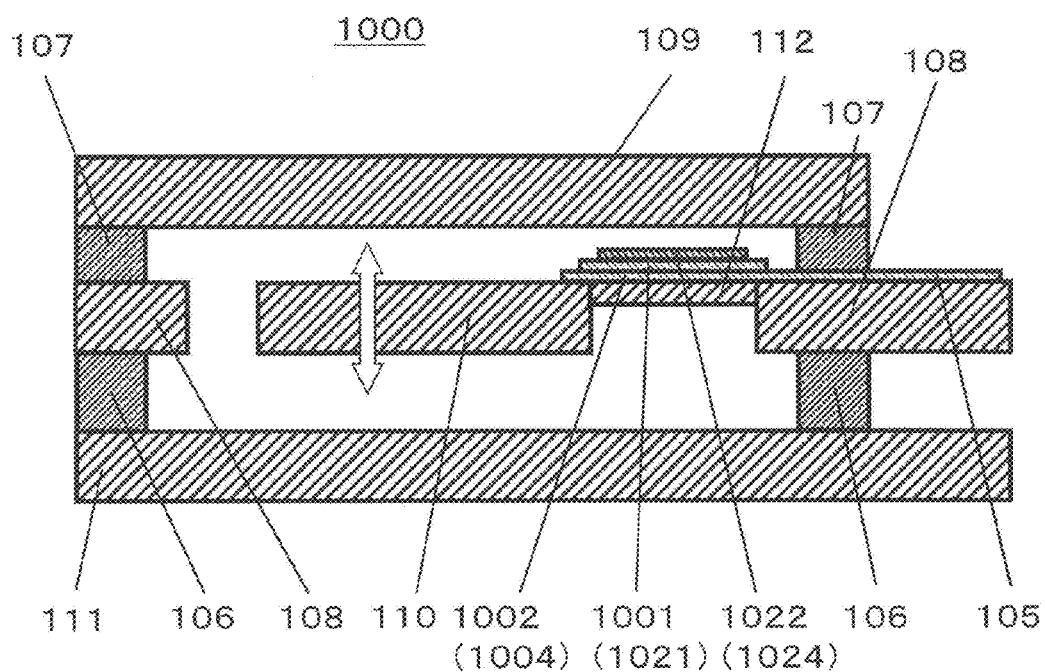
FIG. 7 is a cross-sectional view showing a generation vibration sensor according to a second embodiment of the present invention.

A second embodiment of the present invention has the structure shown in FIG. 7. A generation vibration sensor 1000 of the second embodiment differs from the generation vibration sensor 100 of the first embodiment in that the generation vibration sensor 1000 of the second embodiment uses a piezoelectric element to perform power generation, unlike the generation vibration sensor 100 of the first embodiment that uses the electret to perform the power generation. The structures of components other than the above-mentioned points of this embodiment are the same as those of the first embodiment.

Referring to FIG. 7, the structure of the generation vibration sensor 1000 will be described below. As will be mentioned below, the generation vibration sensor 1000 includes the movable substrate 110 vibrating therein.

The generation vibration sensor 1000 includes the lower substrate (first substrate) 111, the upper substrate (second substrate) 109, the movable substrate (hereinafter sometimes referred to as a movable portion, a weight, or a vibrator) 110, the springs (elastic structures) 112, the fixed structures 108, the upper connection parts 107, the lower connection parts 106, a first piezoelectric element 1001, a first lower electrode 1002, a first upper electrode 1022, and the first pad 105.

The upper substrate 109 and the lower substrate 111 are disposed in parallel and opposed to each other. The upper substrate 109 and the lower substrate 111 are disposed at respective predetermined distances from a member including the movable substrate 110, the springs 112, and the fixed structures (intermediate substrates) 108. The upper substrate 109 and the lower substrate 111 are fixed to the above member by the upper connection parts 107 and the lower connection parts 106.

The member including the fixed structure 108, the movable substrate 110, and the springs 112 is formed by processing one piece of substrate. Thus, the member including the fixed structure 108, the movable substrate 110, and the spring 112 may be equal to "the intermediate substrates 108 being connected to the movable substrate 110 by the elastic structures 112", or "the intermediate substrate 108 including the weight 110 being movable by the elastic structures 112".

The movable substrate 110 is configured to be movable in at least one axial direction perpendicular to the upper substrate 109 or lower substrate 111 (for example, in the directions indicated by a both direction arrow of FIG. 7). Thus, as shown in FIG. 7, the movable substrate 110 can vibrate (reciprocate) perpendicular to the upper substrate 109, following the force (vibration) applied from the outside.

The surface of the member including the intermediate substrate 108, the movable substrate 110 and the elastic structures 112 facing the upper substrate 109 is referred to as an upper surface.

The first lower electrode 1002, the first piezoelectric element 1001, and the first upper electrode 1022 are stacked over the upper surface of the member including the intermediate substrate 108, the movable substrate 110 and the elastic structures 112. The wiring for connecting the first lower electrode 1002 is connected to the first pad 105 through a region near the upper surface.

Figure 8:
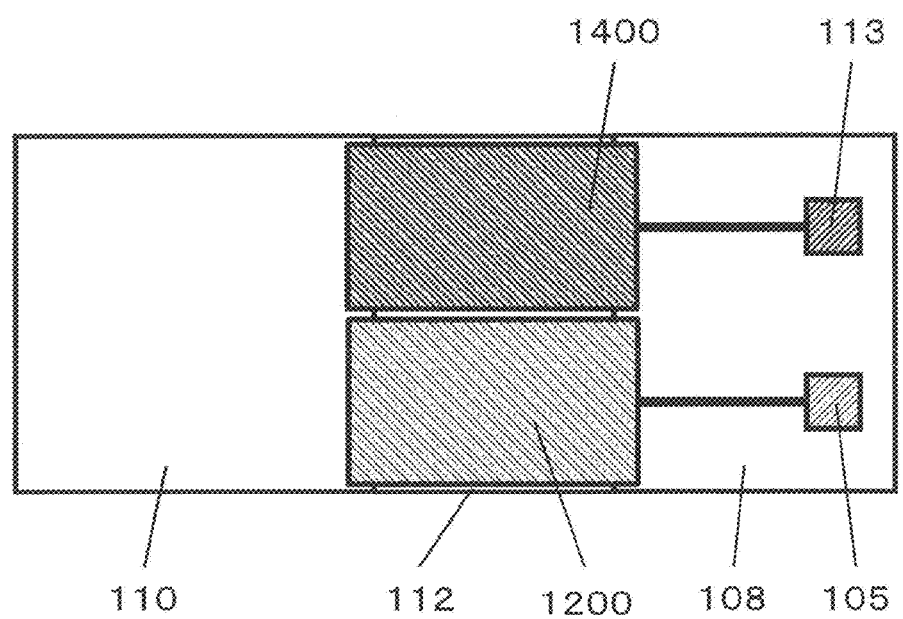
FIG. 8 is a top view for describing the arrangement of a laminated structure in one aspect of the generation vibration sensor in the second embodiment.

FIG. 8 is a schematic view of the upper surface of the member including the intermediate substrate 108, the movable substrate 110 and the elastic structures 112 viewed from the direction perpendicular to the upper surface of the member including the intermediate substrate 108, the movable substrate 110 and the elastic structures 112. The both direction arrow in FIG. 7 shows the directions in which the movable substrate 110 can vibrate.

As shown in FIG. 8, a first laminated structure 1200 including the first lower electrode 1002, the first piezoelectric element 1001, and the first upper electrode 1022, and a second laminated structure 1400 including a second lower electrode 1004, a second piezoelectric element 1021, and a second upper electrode 1024 are arranged in parallel over the elastic structure 112 of the upper surface of the intermediate substrate 108. The wiring for connecting the second lower electrode 1004 is connected to the second pad 113 through a region near the upper surface. The first pad 105 is electrically isolated from the second pad 113. The generation vibration sensor 1000 outputs the generated electric power through the first pad 105 and the second pad 113, respectively.

Figure 9:
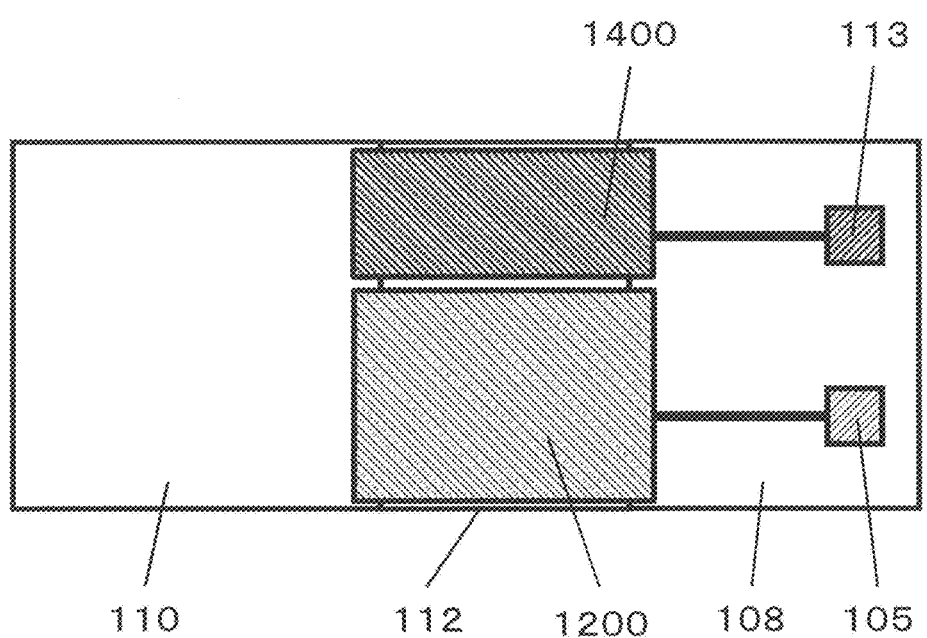
FIG. 9 is a top view for describing the arrangement of a laminated structure of another aspect of the generation vibration sensor according to the second embodiment.

As shown in FIG. 8, the first laminated structure 1200 and the second laminated structure 1400 may have the same area. Alternatively, as shown in FIG. 9, the first laminated structure 1200 may be formed more largely than the second laminated structure 1400. The first laminated structure 1200 is used for power generation, and the second laminated structure 1400 is used for sensing that determines the state of the tire or the road surface. As shown in FIG. 9, the first laminated structure 1200 used for power generation is formed more largely than the second laminated structure 1400 used for sensing, which can increase the amount of power generated to compensate for the power required for the sensing by a little vibration operation. The electricity storage unit can be omitted in the power source unit 150 shown in FIG. 3.

Turning back to FIG. 7, the operation of the generation vibration sensor 1000 will be described. In the generation vibration sensor 1000, the movable substrate 110 vibrates while following the force (for example, vibration) received from the external environment. A spring constant and resonance frequency of the elastic structure 112 are optimized such that the maximum amplitude is generated at a vibration frequency of the external environment (for example, vibration of a vehicle during traveling) assumed.

In vibration of the movable substrate 110, the first piezoelectric element 1001 and the second piezoelectric element 1021 are distorted according to the deformation of the elastic structure 112. Since the piezoelectric element is distorted to generate voltage, the piezoelectric elements repeatedly vibrate vertically in the direction perpendicular to the upper surface of the intermediate substrate 108, thereby alternately perform the power generation.

The operation of such a generation vibration sensor 1000 generates alternate-current power.

At this time, the alternate-current powers output from the first pad 105 and the second pad 113 are the same in transition of fluctuation of the power. That is, when the alternate-current power from the first pad 105 is increased, the alternate-current power from the second pad 113 is also increased. The same goes for the case when the alternate-current power from the first pad 105 is decreased. The respective alternate-current powers vary in synchronism with each other.

The power management circuit 120 converts the alternate-current power output through the first pad 105 of the generation vibration sensor 1000 into direct-current power to be output.

In contrast, the alternate-current power output through the second pad 113 of the generation vibration sensor 1000 is input to the controller 210 as a data signal for vibration.

<2-2. Modification>

As a modification of the second embodiment, only either the first laminated structure 1200 or the second laminated structure 1400 may be disposed over the upper surface of the member including the intermediate substrate 108, the movable substrate 110 and the elastic structures 112 to be connected to the first power system and the second power system. Further, one power system connected to and leading from the laminated structure may be branched into one or more first power systems and one or more second power systems. This arrangement can simplify the structure of the generation vibration sensor.

Alternatively, only either the first laminated structure 1200 or the second laminated structure 1400 are disposed over the upper surface of the member including the intermediate substrate 108, the movable substrate 110 and the elastic structures 112 to be connected to one power system. By the one power system, the sensing may be performed and then the one power system may perform the power generation. After the power generation by the one power system, the same one power system may perform sensing.

<2-3. Summary of Second Embodiment>

As mentioned above, in the generation vibration sensor 1000 of the second embodiment, the outer surface of the generation vibration sensor 1000 with a larger area (for example, the bottom surface of the lower substrate 111 or the upper surface of the upper substrate 109 shown in FIG. 7) is placed in parallel to the back surface of the tire 310 and firmly fixed to the tire 310. In this case, when the normal direction Z of the circular tire 310 shown in FIG. 1 can be aligned with the vibration direction of the movable substrate 11 of the generation vibration sensor 1000 shown in FIG. 7 (for example, in the directions indicated by both direction arrow of FIG. 7), which can make effective use of the vibration in the direction Z.

With this structure, the vibration information is extracted from the waveform of the generated power output from the generation vibration sensor 1000, whereby the vibration generator can serve as the vibration sensor. This embodiment eliminates the need for the vibration sensor, such as an acceleration sensor, which can simplify the structure of the tire sensing system by decreasing the number of parts thereof. Further, this embodiment can reduce the power consumption, size, and cost of the transmitter 200.

Moreover, this embodiment can achieve the high reliability of the generation vibration sensor 1000 on the tire 310, the effective power generation, and the high sensitive detection of vibration.

<3. Third Embodiment>

A third embodiment of the present invention will be described below.

The third embodiment will describe an analysis method of vibration data obtained from the generation vibration sensor explained in the first and second embodiments, and an estimation method of the state of the tire or the road surface using the analysis method.

<3-1. Analysis Method of Vibration Data, and Estimation Method of State of Tire or Road Surface>

Referring to FIGS. 10 and 11, a method for converting a power output waveform into an external vibration waveform will be described below. In order to output the power corresponding to the waveform of external vibration in the generation vibration sensor (vibration generator), the data analysis unit 530 shown in FIG. 2 can obtain the waveform of the external vibration by analyzing the waveform of the generated power output.

Figure 10A:
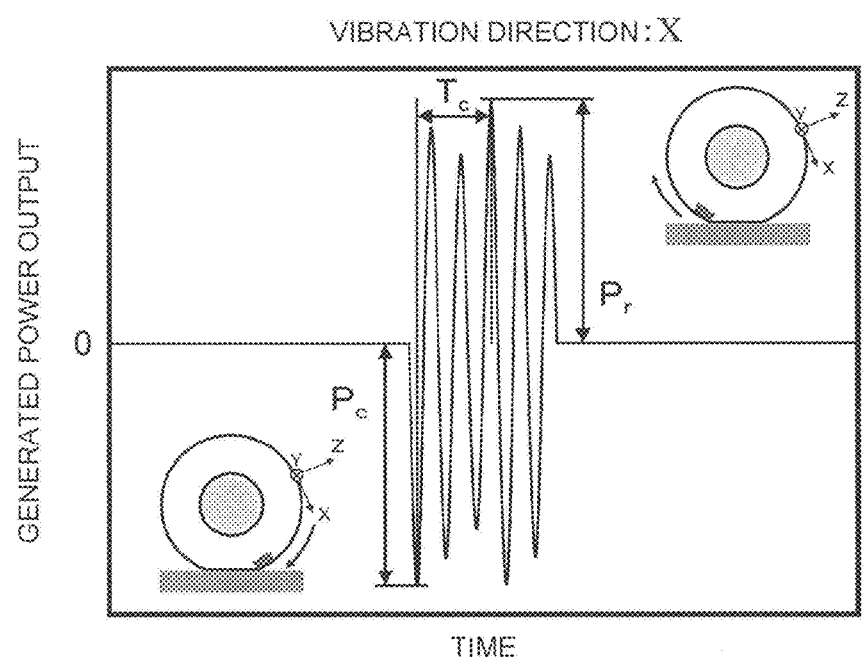
FIG. 10A is a diagram showing a relationship between the generated power output from a generation vibration sensor and time (the vibration direction of the generation vibration sensor is the same as the tangential direction X).
Figure 10B:
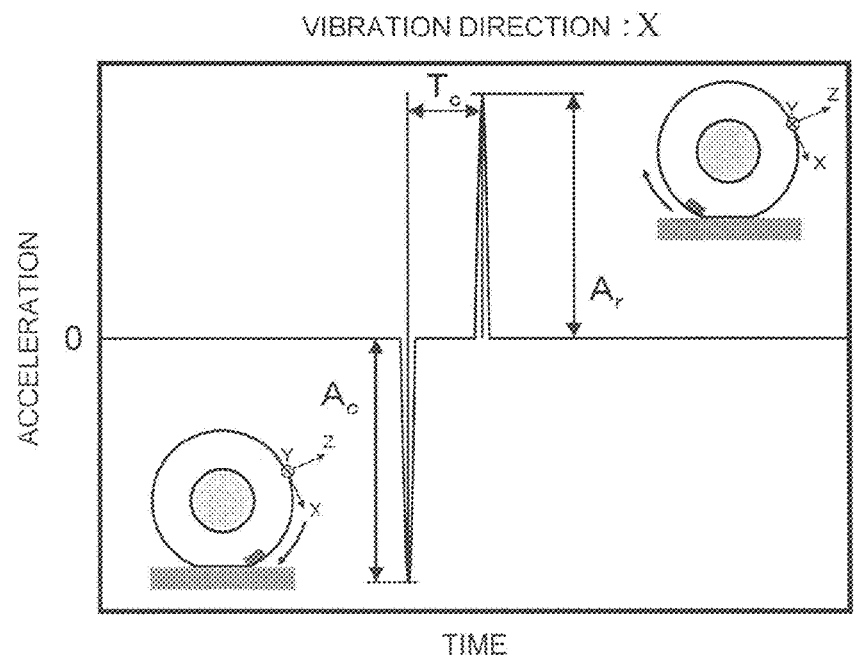
FIG. 10B is a diagram showing a relationship between the acceleration generated in a generation vibration sensor and time (the vibration direction of the generation vibration sensor is the same as the tangential direction X).

In FIG. 10A, the horizontal axis indicates the time, and the longitudinal axis indicates the generated power output by vibration of the circular tire in the tangential direction X. In FIG. 10B, the horizontal axis indicates the time, and the longitudinal axis indicates the acceleration indicative of the degree of vibration of the circular tire in the tangential direction X, which is determined from the generated power shown in FIG. 10A.

When the tire rotates to bring the generation vibration sensor into contact with the road surface via the tire, the rotary speed of the generation vibration sensor is decreased, and a contact acceleration $A_c$ is added. When the tire further rotates to position the generation vibration sensor spaced away from the road surface, the tire is released from the road surface, thereby accelerating the generator vibration sensor, and a removal acceleration $A_r$ is added. The time from the contact of the generation vibration sensor with the road surface to the departure of the sensor from the road surface is regarded as a contact time $T_c$.

The vibrator of the generation vibration sensor is displaced by the contact acceleration $A_c$ to freely vibrate itself. In this case, the contact generated power output $P_c$ according to the contact acceleration $A_c$ is obtained. For example, as the contact acceleration $A_c$ becomes larger, the vibrator is displaced more largely, which results in an increase in contact generated power output $P_c$. Subsequently, the vibrator freely vibrates again by the removal acceleration $A_r$, so that the removal generated power output $P_r$ according to the removal acceleration $A_r$ is obtained.

The contact generated power output $P_c$ is negative, and the removal generated power output $P_r$ is positive. Alternatively, the positive and negative may be reversed depending on the definition.

The power waveform shown in FIG. 10A is obtained to extract the contact generated power output $P_c$, the removal generated power output $P_r$, and the contact time $T_c$, which can produce the external vibration waveform including the contact acceleration $A_c$, the removal acceleration $A_r$, and the contact time $T_c$ shown in FIG. 10B.

Figure 11A:
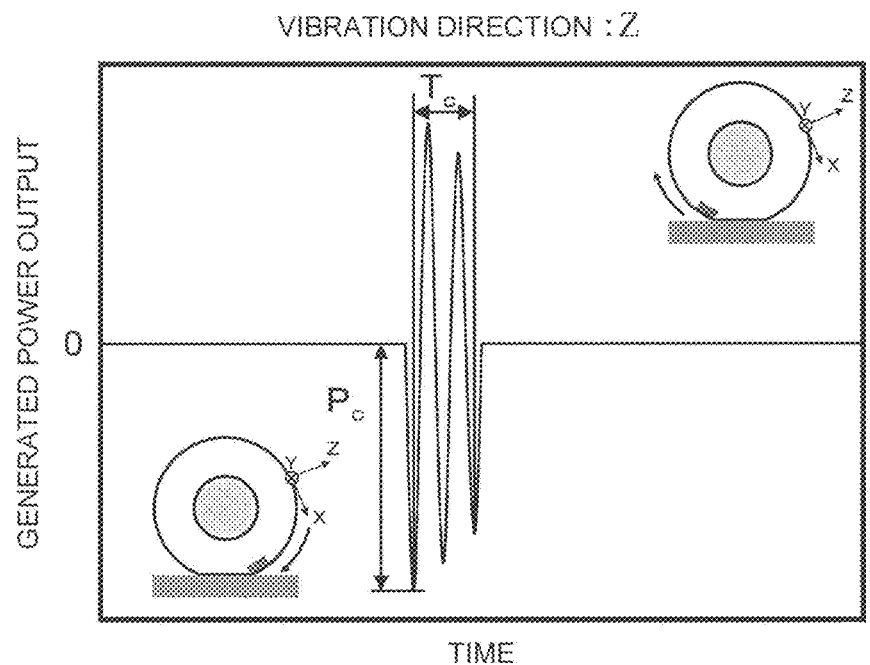
FIG. 11A is other diagram showing a relationship between the generated power output from the generation vibration sensor and time (the vibration direction of the generation vibration sensor is the same as the normal direction Z).
Figure 11B:
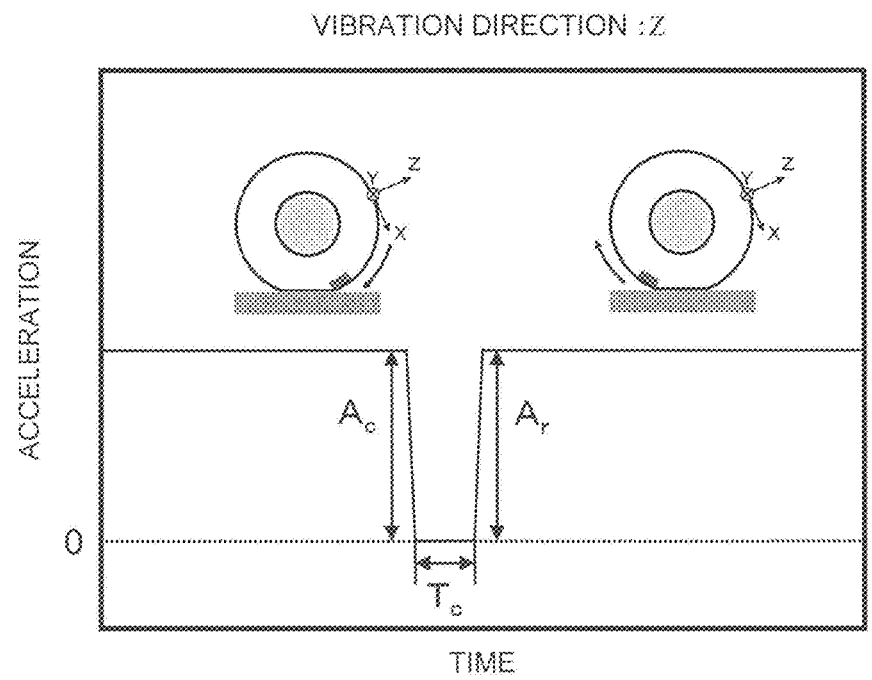
FIG. 11B is other diagram showing a relationship between the generated power output from the generation vibration sensor and time (the vibration direction of the generation vibration sensor is the same as the normal direction Z).

In FIG. 11A, the horizontal axis indicates the time, and the longitudinal axis indicates the generated power output by vibration of the circular tire in the normal direction Z. In FIG. 11B, the horizontal axis indicates the time, and the longitudinal axis indicates the acceleration indicative of the degree of vibration of the circular tire in the normal direction Z.

When the tire rotates to bring the generation vibration sensor into contact with the road surface via the tire, the centrifugal force applied on the generation vibration sensor is decreased and the contact acceleration $A_c$ is added. When the tire further rotates to position the generation vibration sensor spaced away from the road surface, the tire is released from the road surface to thereby apply the centrifugal force to the generation vibration sensor, whereby the removal acceleration $A_r$ is added.

The vibrator of the generation vibration sensor is displaced by the contact acceleration $A_c$ to freely vibrate itself. In this case, the contact generated power output $P_c$ according to the contact acceleration $A_c$ is obtained. Subsequently, the centrifugal force is applied to the vibrator again by the removal acceleration $A_r$, whereby the free vibration thereof is inhibited with no generated power.

The power waveform shown in FIG. 11A is obtained to extract the contact generated power output $P_c$, and the contact time $T_c$, which can produce the external vibration waveform including the contact acceleration $A_c$, the removal acceleration $A_r$, and the contact time $T_c$ shown in FIG. 11B.

As mentioned above, the external vibration waveform can be obtained by the generation vibration sensor.

Figure 12A:
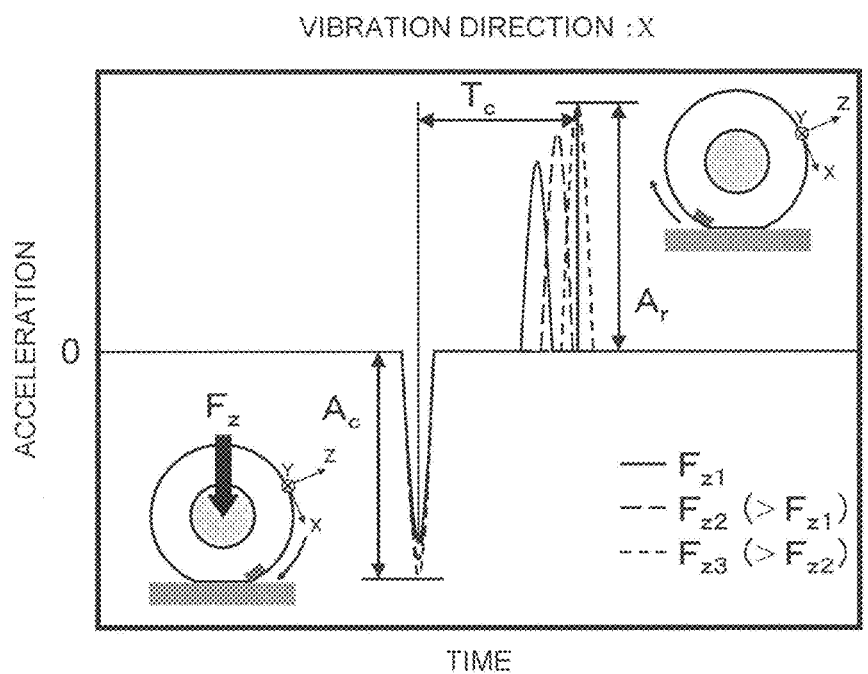
FIG. 12A is a diagram showing a relationship between the acceleration of the tangential direction X generated in a generation vibration sensor and time.

Next, an analysis method of vibration data and an estimation method of the state of the tire or the road surface will be described with reference to FIG. 12A. In FIG. 12A, the horizontal axis indicates the time, and the longitudinal axis indicates an acceleration indicative of the degree of vibration of the circular tire in the tangential direction X.

In the vehicle, the tire is deformed by air pressure of the tire or the weight of the vehicle, and the like, thereby changing a contact area between the tire and the road surface. For example, when the vehicle is heavy, or when the air pressure of the tire is low, the tire is deformed by being pressed in the direction of the road surface, which increases the contact area between the tire and the road surface. Referring to FIG. 12A, the amount of deformation of the tire can be represented by the force F, pressing the tire toward the road surface in the direction Z perpendicular to the road surface. Increasing the force $F_z$ in the following order: $F_{z1}$, $F_{z2}$, $F_{z3}$ means strongly pressing the tire against the road surface, thereby increasing the contact area between the tire and the road surface.

When the contact area between the tire and the road surface becomes larger at a constant speed, the contact time $T_c$ is also increased. Since the tire is largely deformed, the contact acceleration $A_c$ and the removal acceleration $A_r$ is increased.

Analysis of these parameters estimates the state of tire or road surface. For example, when the air pressure of the tire is decreased because of the puncture of the tire, the deformation of the tire is so large that the contact time $T_c$ becomes longer and the contact acceleration $A_c$ and removal acceleration $A_r$ become higher.

Figure 12B:
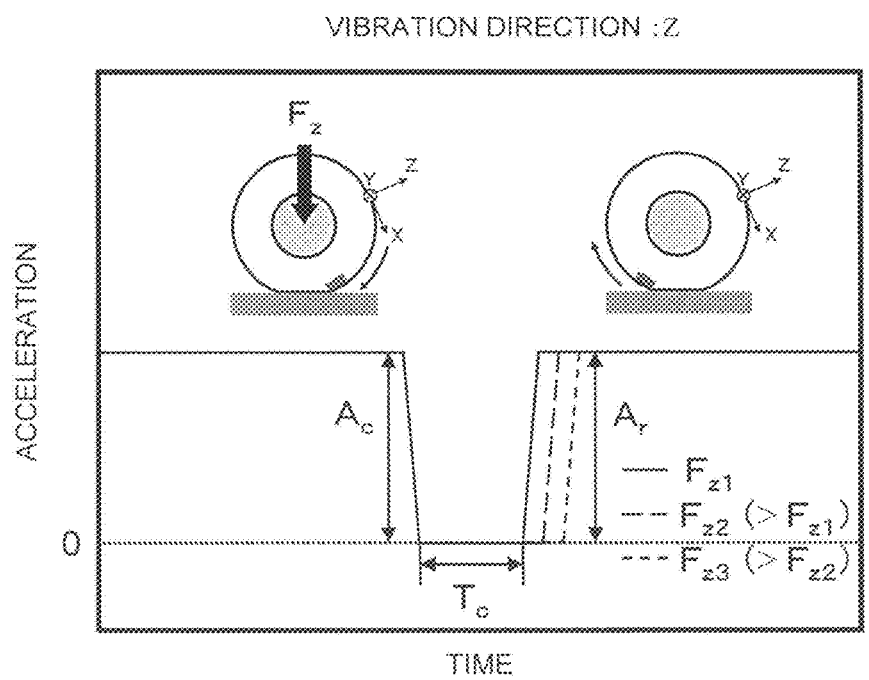
FIG. 12B is a diagram showing a relationship between the acceleration of the normal direction Z generated in a generation vibration sensor and time.

Data on vibration of the circular tire in the normal direction Z is also useful. In FIG. 12B the horizontal axis indicates the time, and the longitudinal axis indicates an acceleration indicative of the degree of vibration of the circular tire in the normal direction Z. When the contact area between the tire and the road surface becomes larger at a constant speed, the contact time $T_c$ is also increased.

The estimation method of the state of the tire or the road surface is the same as the above-mentioned method using the tangential direction X.

As mentioned above, the generation vibration sensor can estimate the state of the tire or the road surface.

Figure 14:
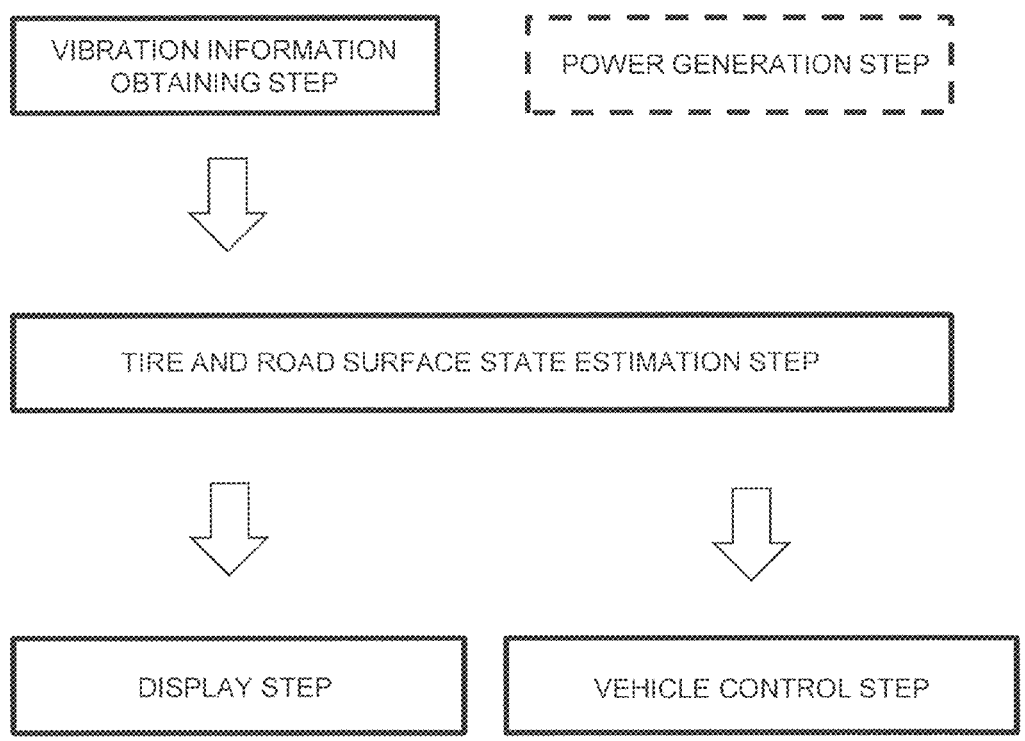
FIG. 14 is a block diagram for describing a method for determining the state of the tire or the road surface.

FIG. 14 is a block diagram for describing a method of determining the state of the tire or the road surface in detail. As shown in FIG. 14, first, the tire as the moving means rotates to vibrate the generation vibration sensor attached to the inner surface of the tire and mentioned in the first or second embodiment, thereby generating the electric power (power generation step), and then obtaining the vibration information (vibration information obtaining step). The electric power generated in the power generation step may be used to transmit the vibration information from the transmitting unit 220 of the transmitter 200 to the receiving unit 510 of the receiver 500. In another embodiment, the vibration information may be transmitted using no electric power generated in the power generation step, but using the electric power supplied by the power supply device. As shown in FIG. 14, the analysis method of the vibration data and the estimation method of the state of the tire and the road surface in the third embodiment estimate the state of the tire and the road surface from the above-mentioned vibration information (tire and road surface state estimation step). For example, the structure vibrating in the tangential direction of the circular tire (the structures shown in FIGS. 4A and 4B) increases a first vibration which is applied to the generation vibration sensor upon contact of the sensor with the road surface via the tire (hereinafter sometimes simply referred to as "first vibration"), and a second vibration which is applied to the generation vibration sensor upon departure of the generation vibration sensor from the road surface (hereinafter sometimes simply referred to as "second vibration"). When the time from the first vibration to the second vibration (hereinafter sometimes simply referred to as the "contact time") becomes long, the tire is determined to decrease its air pressure.

For example, when the contact time becomes longer in the structure (structure shown in FIG. 7) vibrating in the normal direction of the circular tire, the air pressure of the tire is determined to be decreased.

Further, for example, when the first and second vibrations become larger and the contact time becomes shorter in the structure vibrating in the tangential direction of the circular tire (structure shown in FIGS. 4A and 4B), the tire is determined to be slippery.

Moreover, for example, when the first and second vibrations become smaller and the contact time becomes shorter in the structure vibrating in the tangential direction of the circular tire (structure shown in FIGS. 4A and 4B), the tire is determined to experience less friction force against the road surface and to be slippery.

For example, when the first and second vibrations become larger and the contact time becomes shorter in the structure vibrating in the normal direction of the circular tire (structure shown in FIG. 7), the tire is determined to be slippery.

Based on the information about the state of the tire or the road surface obtained in the way described above, the vehicle as the moving means is controlled (vehicle control step).

For example, when the air pressure of the tire is determined to be decreased, the fact of the decrease in air pressure of the tire is displayed on a displaying unit of the moving means to let a driver know.

For example, when the tire is determined to be slippery, the fact of the slippery properties of the tire is displayed on the displaying unit of the moving means to let the driver know. Moreover, for example, anti-blocking system is operated via the vehicle controller 600.

As mentioned above, the state of the tire or the road surface is determined, and the information on the state is appropriately transferred to the driver, which can achieve the safety control of the moving means.

<3-2. Summary of Third Embodiment>

According to the estimation method of the state of the tire or the road surface of the third embodiment, the amount of deformation of the tire, and the friction force between the tire and the road surface are extracted from the parameters, including the contact time $T_c$, the contact acceleration $A_c$, and the removal acceleration $A_r$, upon the contact and removal of the generation vibration sensor on or from the road surface due to the rotation of the tire, whereby the state of the tire or the road surface can be estimated.

This structure can control the display of a warning of a vehicle, a vehicle shaft, and a braking according to the state of the tire or the road surface.

<4. Fourth Embodiment>

A fourth embodiment of the present invention will be described below.

The fourth embodiment of the present invention will describe an estimation method of the state of the tire or the road surface by the rotary speed of the tire. The structure of the fourth embodiment except for the above point is the same as that of the third embodiment.

<4-1. Analysis Method of Vibration Data, and Estimation Method of State of Tire or Road Surface>

Figure 13A:
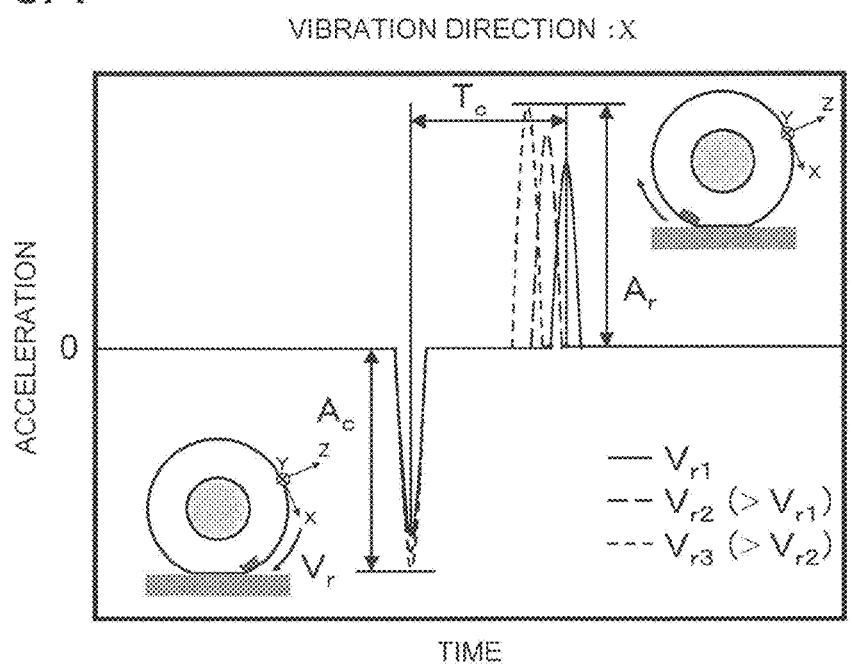
FIG. 13A is a diagram showing a relationship between the acceleration of the tangential direction X generated in a generation vibration sensor and time.

Referring to FIG. 13A, an analysis method of vibration data and an estimation method of the state of the tire or the road surface will be described below. In FIG. 13A, the horizontal axis indicates the time, and the longitudinal axis indicates an acceleration indicative of the degree of vibration of the circular tire in the tangential direction X.

When the rotary speed of the tire $V_r$ is increased in the following order: $V_{r1}$, $V_{r2}$, $V_{r3}$, the contact time $T_c$ is decreased. The contact acceleration $A_c$ and the removal acceleration $A_r$ are increased together with the deceleration or acceleration of the generation vibration sensor.

Analysis of these parameters estimates the state of tire or the road surface. For example, when the tire wears to decrease the friction force between the tire and the road surface, or when the road surface is slippery, the tire races, which leads to an increase in rotary speed $V_r$ of the tire. For this reason, the contact time $T_c$ becomes shorter, and the contact acceleration $A_c$ and the removal acceleration $A_r$ are increased. When the friction force between the tire and the road surface is significantly decreased, the contact acceleration $A_c$ and removal acceleration $A_r$ become lower.

Figure 13B:
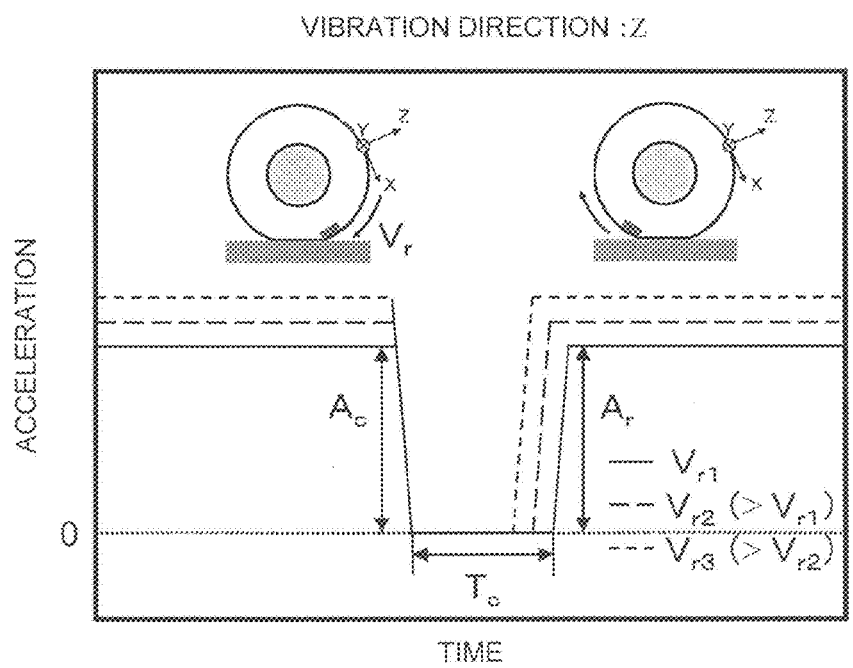
FIG. 13B is a diagram showing a relationship between the acceleration of the normal direction Z generated in a generation vibration sensor and time.

Data on vibration of the circular tire in the normal direction Z is also useful. In FIG. 13B, the horizontal axis indicates the time, and the longitudinal axis indicates an acceleration indicative of the degree of vibration of the circular tire in the normal direction Z.

When the tire races to increase the rotary speed $V_r$ thereof, the centrifugal force applied to the generation vibration sensor is getting larger, so that the contact time $T_c$ becomes shorter, while the contact acceleration $A_c$ and the removal acceleration $A_r$ become higher.

The estimation method of the state of the tire or the road surface is the same as that of the above-mentioned method using the tangential direction X.

As mentioned above, the generation vibration sensor can estimate the state of the tire or the road surface.

<4-2. Summary of Fourth Embodiment>

According to the estimation method of the state of the tire or the road surface of the fourth embodiment, the rotary speed of the tire, and the friction force between the tire and the road surface are extracted from the parameters, including the contact time $T_c$, the contact acceleration $A_c$, and the removal acceleration $A_r$, upon the contact and removal of the generation vibration sensor on and from the road surface due to the rotation of the tire, whereby the state of the tire or the road surface can be estimated.

This structure can control the display of a warning of the vehicle, the vehicle shaft, and the braking according to the state of the tire or the road surface.

<5. Other Embodiments>

The idea of the present disclosure is not limited to the above-mentioned embodiments. Other embodiments will be described below.

In the above embodiments, the tire sensing system may include a data table indicative of a list including the vibration information and the state of the tire or the road surface corresponding to the vibration information.

Referring to the data table, vibration information actually measured is verified against the vibration information included in the data table to thereby determine the state of the tire or the road surface.

The tire sensing system may convert the vibration information into protocol description. Thus, the information structure can be simplified to thereby increase the speed of communications and information processing.

The power generated from the two systems, namely, the first electrode 102 or 1002 and the second electrode 104 or 1024 of the generation vibration sensor 100 or 1000 is used for either one of the power generation and the vibration detection. Alternatively, only one system of the first electrode 102 or 1002 may be branched to be used for the power generation and the vibration detection.

The movable substrate 110 of the generation vibration sensor 100 or 1000 vibrates, for example, in the directions as indicated by the both direction arrow of FIG. 4. However, this does not mean that the vibration in any directions other than those indicated by both direction arrow is excluded. The generation vibration sensor 100 or 1000 is disposed on the backside (inside) of the tire 310 such that the direction of the external vibration is aligned with the vibration direction of the movable substrate 110 of the generation vibration sensor 100 or 1000, which can make use of the external vibration.

<6. Summary>

The above embodiments disclose the following ideas about the tire sensing system and generation vibration sensor.

According to a first aspect of the present invention, provided is a tire sensing system for monitoring state(s) of a tire and/or a road surface from information on vibration around the tire, thereby performing safety control of moving means having the tire, the sensing system including: a sensor disposed in a position of an inner surface of the tire where the sensor can sense the vibration; a receiver for receiving the vibration information sent from the sensor; and a control means for controlling the moving means on the basis of the vibration information from the receiver, wherein the state (s) of the tire and/or the road surface is/are estimated from first vibration applied to the sensor upon contact of the sensor with the road surface via the tire due to the tire rotation, second vibration applied to the sensor upon departure of the sensor from the road surface, and a contact time from the contact of the sensor with the road surface to the departure of the sensor from the road surface.

According to a second aspect of the present invention, in the tire sensing system of the first aspect, the state(s) of the tire and/or the road surface may include an air pressure of the tire, or a friction force between the tire and the road surface.

According to a third aspect of the present invention, in the tire sensing system of the first aspect, when the first vibration and the second vibration become larger in the vibration along a tangential direction of the circular tire and the contact time becomes longer, the air pressure of the tire is determined to be decreased.

According to a fourth aspect of the present invention, in the tire sensing system of the first aspect, when the contact time becomes longer in the vibration along a normal direction of the circular tire, the air pressure of the tire is determined to be decreased.

According to a fifth aspect of the present invention, in the tire sensing system of the first aspect, when the first vibration and the second vibration become larger in the vibration along the tangential direction of the circular tire and the contact time becomes shorter, the tire is determined to be slippery.

According to a sixth aspect of the present invention, in the tire sensing system of the first aspect, when the first vibration and the second vibration become smaller in the vibration along the tangential direction of the circular tire and the contact time becomes shorter, friction force between the tire and the road surface is determined to be decreased, and the tire is determined to be slippery.

According to a seventh aspect of the present invention, in the tire sensing system of the first aspect, when the first vibration and the second vibration become larger in the normal direction of the circular tire and the contact time becomes shorter, the tire is determined to be slippery.

According to an eighth aspect of the present invention, the tire sensing system of the first aspect may further include a data table indicative of a list of the vibration information and the state(s) of the tire and/or the road surface corresponding thereto, and referring to the data table, vibration information actually measured may be verified against the vibration information included in the data table to thereby determine the state(s) of the tire and/or the road surface.

According to a ninth aspect of the present invention, in the tire sensing system of the first embodiment, the vibration information may be converted into protocol to perform communications or information processing.

According to a tenth aspect of the present invention, in the tire sensing system of the first embodiment, the sensor is a generation vibration sensor including a power generating element for converting the vibration into electric power and being adapted to extract the vibration information from a power output waveform, and in which the tire sensing system further includes a power system, the power system being connected to the power generating element and adapted to extract the vibration information obtained by the power generating element.

According to an eleventh aspect of the present invention, the tire sensing system of the tenth aspect further includes a second power system, the second power system being connected to the power generating element and adapted to supply the electric power for sending the first vibration information extracted by the power system to the outside.

According to a twelfth aspect of the present invention, in the tire sensing system of the eleventh aspect, the power generating element includes:

a fixed substrate;

a movable substrate having one main surface opposed to one main surface of the fixed substrate, the movable substrate being capable of vibrating substantially in parallel to the fixed substrate;

a plurality of electrets disposed at one of the one main surface of the fixed substrate and the one main surface of the movable substrate in parallel with respect to a direction of vibration of the movable substrate; and a first electrode and a second electrode alternately disposed over the other of the one main surface of the fixed substrate and the one main surface of the movable substrate in parallel with respect to the vibration direction, the first and second electrodes being connected to one of the first power system and the second power system.

According to a thirteenth aspect of the present invention, in the tire sensing system of the eleventh embodiment, the power generating element includes:

an elastic structure repeatedly warped cyclically;

a fixed substrate connected to one end of the elastic structure;

a movable substrate connected to the other end of the elastic structure; and a first laminated structure and a second laminated structure provided over the elastic structure, and connected to one of the first power system and the second power system, in which the first laminated structure includes a first lower electrode, a first piezoelectric element formed over the first lower electrode, and a first upper electrode formed over the first piezoelectric element, and in which the second laminated structure includes a second lower electrode, a second piezoelectric element formed over the second lower electrode, and a second upper electrode formed over the second piezoelectric element.

According to a fourteenth aspect of the present invention, a generation vibration sensor includes:

a power generating element for converting vibration into electric power;

a first power system for extracting vibration information obtained by the power generating element; and a second power system connected to the power generating element, and adapted to supply electric power for sending the vibration information extracted by the first power system to the outside.

According to a fifteenth aspect of the present invention, in the generation vibration sensor of the fourteenth aspect, two or more power generating elements are provided, the first power system is connected to at least one of the two or more power generating elements, and the second power system is connected to at least one remaining element of the two or more power generating elements.

According to a sixteenth aspect of the present invention, in the generation vibration sensor of the fourteenth or fifteenth aspect, the first power system and the second power system are connected to the single power generating element.

According to a seventeenth aspect of the present invention, in the generation vibration sensor of any one of the fourteenth to sixteenth aspect, the power generating element includes:

a fixed substrate;

a movable substrate having one main surface opposed to one main surface of the fixed substrate, the movable substrate being capable of vibrating substantially in parallel to the fixed substrate;

a plurality of electrets disposed at one of the one main surface of the fixed substrate and the one main surface of the movable substrate in parallel with respect to a direction of vibration of the movable substrate; and a first electrode and a second electrode alternately disposed over the other of the one main surface of the fixed substrate and the one main surface of the movable substrate in parallel with respect to the vibration direction, the first and second electrodes being connected to one of the first power system and the second power system.

According to an eighteenth aspect of the present invention, in the generation vibration sensor of one of the fourteenth to sixteenth aspects, the power generating element includes:

an elastic structure repeatedly warped cyclically;

a fixed substrate connected to one end of the elastic structure;

a movable substrate connected to the other end of the elastic structure; and a first laminated structure and a second laminated structure provided over the elastic structure, and connected to one of the first power system and the second power system, in which the first laminated structure includes a first lower electrode, a first piezoelectric element formed over the first lower electrode, and a first upper electrode formed over the first piezoelectric element, and in which the second laminated structure includes a second lower electrode, a second piezoelectric element formed over the second lower electrode, and a second upper electrode formed over the second piezoelectric element.

According to a nineteenth aspect of the present invention, a tire is provided which includes the above-mentioned generation vibration sensor on its inner wall, in which the state(s) of the tire and/or the road surface is/are estimated from a power waveform obtained by the generation vibration sensor upon contact of the generation vibration sensor on the ground, and a power waveform obtained in departure of the sensor from the ground.

According to a twentieth aspect of the present invention, an electric device having the above-mentioned generation vibration sensor is provided.

The present disclosure is useful as a tire sensing system for performing the safe control of a vehicle by monitoring the state(s) of the tire and/or the road surface from physical information on the tire and its surroundings.

[Description of Reference Numerals]
100, 1000: Generation vibration sensor
101: Electret
102: First electrode
104: Second electrode
105: First pad
106: Lower connection part
107: Upper connection part
108: Fixed structure
109: Upper substrate
110: Movable substrate (Movable portion, Weight, Vibrator)
111: Lower substrate
112: Spring (Elastic structure)
113: Second pad
120: Power management circuit
130: Electricity storage unit
140: Power generating unit
150: Power source unit
200: Transmitter
210: Controller
220: Transmitting unit
310: Tire
320: Wheel
330: Rotary direction
400: Road surface
500: Receiver
510: Receiving unit
520: Signal processor
530: Data analysis unit
540: Vehicle control instruction unit
600: Vehicle controller
1001: First piezoelectric element
1002: First lower electrode
1004: Second lower electrode
1021: Second piezoelectric element
1022: First upper electrode
1024: Second upper electrode
1200: First laminated structure
1400: Second laminated structure

What is claimed is:

1. A tire sensing system for monitoring a state of a tire or a road surface from information on vibration around the tire to perform safety control of an object having the tire, the tire sensing system comprising:
   a sensor to be disposed at a position of an inner surface of the tire where the sensor senses the vibration;
   a receiver for receiving the information on the vibration sent from the sensor; and
   a controller that
   (a) extracts from the information on the vibration
      (a1) a first vibration sensed by the sensor upon contact of the sensor with the road surface via the tire due to rotation of the tire,
      (a2) a second vibration sensed by the sensor upon departure of the sensor from the road surface via the tire due to rotation of the tire, and
      (a3) a contact time from the contact of the sensor, via the tire, with the road surface to the departure of the sensor, via the tire, from the road surface, and
   (b) controls the object based on the first vibration, the second vibration, and the contact time.

2. The tire sensing system according to claim 1, wherein the state of the tire or the road surface corresponds to an air pressure of the tire, or a friction force between the tire and the road surface.

3. The tire sensing system according to claim 1, wherein the sensor senses the vibration along a tangential direction of the tire, and
   when the first vibration and the second vibration become larger and the contact time becomes longer, an air pressure of the tire is determined to be decreased.

4. The tire sensing system according to claim 1, wherein the sensor senses the vibration along a normal direction of the tire, and
   when the contact time becomes longer, an air pressure of the tire is determined to be decreased.

5. The tire sensing system according to claim 1, wherein the sensor senses the vibration along a tangential direction of the tire, and
   when the first vibration and the second vibration become larger and the contact time becomes shorter, the tire is determined to be slippery.

6. The tire sensing system according to claim 1, wherein the sensor senses the vibration along a tangential direction of the tire, and
   when the first vibration and the second vibration become smaller and the contact time becomes shorter, a friction force between the tire and the road surface is determined to be decreased, and the tire is determined to be slippery.

7. The tire sensing system according to claim 1, wherein the sensor senses the vibration along a normal direction of the tire, and
   when the first vibration and the second vibration become larger and the contact time becomes shorter, the tire is determined to be slippery.

8. The tire sensing system according to claim 1, further comprising a data table indicative of a list of vibration information and the state of the tire or the road surface corresponding thereto,
   wherein referring to the data table, the information on the vibration from the sensor is verified against the vibration information included in the data table to determine the state of the tire or the road surface.

9. The tire sensing system according to claim 1, wherein the information on the vibration is converted into a protocol to perform communications or information processing.

10. The tire sensing system according to claim 1, wherein the sensor is a generation vibration sensor comprising a power generating element for converting the vibration into electric power and being adapted to output a power output waveform, and
   wherein the tire sensing system further comprises a first power system, the first power system being connected to the power generating element and adapted to extract the information on the vibration from the power output waveform obtained by the power generating element.

11. The tire sensing system according to claim 10, further comprising a second power system, the second power system being connected to the power generating element and adapted to supply the electric power for sending the information on the vibration extracted by the first power system to an outside.

12. The tire sensing system according to claim 11, wherein the power generating element comprises:
   a fixed substrate;
   a movable substrate having one main surface opposed to one main surface of the fixed substrate, the movable substrate being capable of vibrating substantially in parallel to the fixed substrate;
   a plurality of electrets disposed at one of the one main surface of the fixed substrate and the one main surface of the movable substrate in parallel with respect to a direction of vibration of the movable substrate; and a first electrode and a second electrode alternately disposed over another of the one main surface of the fixed substrate and the one main surface of the movable substrate in parallel with respect to the direction of vibration, each of the first electrode and the second electrode being connected to a respective one of the first power system and the second power system.

13. The tire sensing system according to claim 11, wherein the power generating element comprises:

an elastic structure adapted to vibrate;

a fixed substrate connected to one end of the elastic structure;

a movable substrate connected to another end of the elastic structure; and a first laminated structure and a second laminated structure provided over the elastic structure, and each of the first laminated structure and the second laminated structure is connected to a respective one of the first power system and the second power system, wherein the first laminated structure comprises a first lower electrode, a first piezoelectric element formed over the first lower electrode, and a first upper electrode formed over the first piezoelectric element, and wherein the second laminated structure comprises a second lower electrode, a second piezoelectric element formed over the second lower electrode, and a second upper electrode formed over the second piezoelectric element.

* * * * *